United States Patent [19]

Schmidt et al.

[11] 4,098,947

[45] Jul. 4, 1978

[54] COPY PAPER

[76] Inventors: Joachim Schmidt, Weilstrasse 22, 637 Oberursel; Martin Unruh, Vannstrockestrasse 30, 763 Lahr, Sulz, both of Fed. Rep. of Germany

[21] Appl. No.: 551,499

[22] Filed: Feb. 20, 1975

Related U.S. Application Data

[62] Division of Ser. No. 258,876, Jun. 1, 1972, Pat. No. 3,911,195.

[30] Foreign Application Priority Data

Oct. 23, 1970 [GB] United Kingdom ............... 50530/70

[51] Int. Cl.$^2$ ............................................... B32B 5/16

[52] U.S. Cl. .................................... 428/407; 8/162 B; 8/175; 8/DIG. 3; 282/27.5; 427/146; 427/153; 428/327; 428/514; 428/914

[58] Field of Search ............... 427/146, 180, 195, 150, 427/152, 153; 428/411, 514, 537, 323, 327, 511, 913, 914, 402, 403, 407; 282/27.5; 8/130.1, 162 B, 175, DIG. 3, DIG. 10

[56] References Cited

U.S. PATENT DOCUMENTS

| | | | |
|---|---|---|---|
| 2,347,508 | 4/1944 | Rugeley | 8/175 |
| 2,394,688 | 2/1946 | Heyman | 8/175 |
| 2,635,942 | 4/1953 | Thummel | 8/175 |
| 3,036,924 | 5/1962 | Newman | 106/14.5 |
| 3,328,190 | 6/1967 | Mathieu | 117/36.1 |
| 3,652,200 | 3/1972 | Miyasaka | 8/54 |
| 3,697,323 | 10/1972 | Brown | 117/234 |
| 3,768,968 | 10/1973 | van der Eltz | 8/175 |

*Primary Examiner*—Thomas J. Herbert, Jr.
*Assistant Examiner*—Bruce H. Hess
*Attorney, Agent, or Firm*—Burgess, Ryan and Wayne

[57] ABSTRACT

A sheet of paper suitable as a multi-copy paper or once only copy paper is made by coating with a layer of finely particulate mutually adherent particles of a vinyl chloride polymer if pigments are used as colouring matter and of any swellable polymer if a dyed layer is to be used. Generally, the particulate material is swelled using suitable swelling agents and applied to a support layer by any suitable coating process.

4 Claims, 2 Drawing Figures

COPY PAPER

Figure 1:
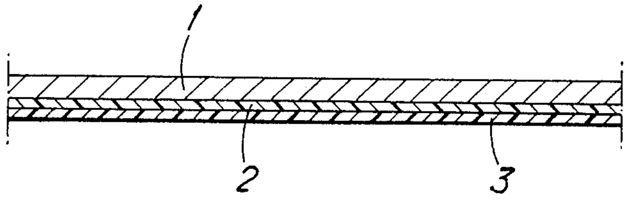

This is a division, of application Ser. No. 258,876, filed June 1, 1972 now U.S. Pat. No. 3,911,195.

This invention relates to a multicopy paper in the form of sheets or tape for producing copies without the necessity of using carbon paper, and to a method of manufacturing the same.

Multicopy papers are known comprising a layer of colour pigment having an incomplete internal bond, which can be transferred from one paper to the surface of another paper, which is to carry the final copy, by application of strong local pressure, in particular by means of writing instruments, such papers utilising wax-like connecting materials. It is also known to produce the layer of colour pigments from powder particles of a synthetic resin, especially a resin based on polyvinyl chloride, which particles are locally combined at their points of contact. It has been found that multi-copy paper of this type can be produced by distributing the synthetic resin powder particles, which have either been dyed in the mass or covered with colour pigment on their surface, in a liquid medium which causes them to swell, applying the homogeneous swelled mixture in the form of a layer on a support in a known manner and evaporating the liquid medium to produce a layer comprising the synthetic resin powder particles which are joined together at their areas of contact. Heretofore, it was then necessary to apply a covering layer of wax or some wax-like composition to this layer.

Although multi-copy paper of this type already produces reasonably acceptable results as regards resistance to smudging and the quality of the copies, it is still desirable to obtain further improvements in multi-copy paper, especially in the case of such paper for use in data processing machines and modern addressing machines. As is well known, data processing machines operate with a low type touch pressure (line printing rods) because they function with only a slight rolling pressure on account of their high output of line printing per hour, which may nowadays be as much as 30,000 to 90,000 lines per hour.

For this reason, it has hitherto not been possible to develop multi-copy papers free from carbon which can produce up to at least 6 clearly legible copies with sharp contours. This number of copies is, however, desired and in a number of cases necessary. Carbon papers used for this purpose generally produce severe smudging of the letters in only the second or third copy. This is due to the soft composition of the carbon ink with wax and oil, which is not resistant to smudging, and due to the insertion of the sheet of single copy carbon paper. If reactive paper were used for this purpose, it would have the disadvantage of being very expensive and not easy to handle. Moreover, even the third or fourth copy would still generally not be sufficiently sharp in the contour of the letters and the intensity of the colour to satisfy present day requirements. In addition, the characters which are made of reactive dye may be bleached by light and hence become illegible.

It is an object of the present invention to provide a sheet of paper suitable for use in a multi-copy paper set which is especially suitable for producing sharp, intensively coloured copies even with a low type touch pressure or rolling pressure, and this ability to produce sharp copies is preferably combined with excellent resistance of the paper to smudging and very high stability in storage.

According to a first aspect of the present invention, there is provided a sheet of paper suitable for use as a multi-copy paper, which sheet of paper comprises a support layer and a substantially uniform layer of finely particulate mutually adherent particles of a vinyl chloride polymer, the polymer having been produced by emulsion polymerisation, containing from 0.01 to 4.0 percent by weight of emulsifier, having a K-value in the range from 60 to 80, the particles having an average size of 50$\mu$ or less and having sieve residues, under standard DIN conditions of, not more than 34% by weight. Advantageously, there is provided a sheet of paper suitable for use as a multi-copy paper, which sheet of paper comprises a support layer and a substantially uniform donor layer of finely particulate mutually adherent particles of a vinyl chloride polymer, the polymer having been dyed prior to formation of the sheet. Preferably, the polymer is a homopolymer.

According to a second aspect of the present invention there is provided a process for producing a sheet of paper in accordance with the first aspect of the present invention, which process comprises distributing finely particulate particles of a vinyl chloride polymer in a volatile organic liquid so that the particles swell and applying the resulting homogeneous distribution of swelled particles as a layer on a support layer, either directly or after suitable dilution, the layer being dried by evaporation of the organic liquid so as to produce a substantially uniform layer of finely dispersed mutually adherent particles. Advantageously, there is provided a process for producing a sheet of paper in accordance with the advantageous embodiment of the first aspect of the present invention, which process comprises distributing finely particulate particles of vinyl chloride polymer in a volatile organic liquid, in which there is dissolved a dye or a material capable of dying the polymer, so that the particles swell and applying the resulting homogeneous distribution of swelled particles as a layer donor on a support layer, either directly or after suitable dilution, the layer being dried by evaporation of the organic liquid so as to produce a substantially uniform layer of finely dispersed mutually adherent particles. Preferably the polymer is a homopolymer.

The present invention also provides a multi-copy set of paper, which comprises a plurality of sheets of paper in accordance with either of the aspects of the present invention, with at least one coloured vinyl chloride polymer (preferably homopolymer) layer on a sheet arranged for transfer to another sheet on application of local pressure to the set of paper.

Copying papers of the type proposed are provided with a donor layer and/or a receptor layer. Papers having merely a donor or receptor layer are known as contact papers (C-papers) which copy on treated or untreated substrates, whereas papers having both a donor layer and a receptor layer are known as self-copying papers (S-papers). The layers are normally applied by a conventional doctor blade technique.

The receptor layer preferably comprises an optionally modified homopolymer or copolymer of ethylene.

It will be appreciated that an essential feature is that the layer of vinyl chloride polymer, preferably homopolymer, which may contain colour pigment or be dyed, is uniform in material and comprises a pure vinyl chloride polymer so that the additives customarily used in many of the known duplicating and copying papers, for example wax, oil, fillers, thickeners and the like, may be omitted.

The term "uniform in material" means that apart from any colouring material present, the layer of vinyl chloride polymer comprises only one uniform material. In the case of the homopolymer the material will be a product of the known emulsion polymerisation process of monomeric vinyl chloride, using conventional emulsifiers. As an example of a polymer, as opposed to a homopolymer, may be mentioned the PVDC/PVC copolymers, such as GEON202 (The word "Geon" is a Trade Mark). The fact that the above mentioned additives used for known duplicating and copying papers are now superfluous not only means a considerable saving in material but is also one of the factors responsible for the advantages of the papers according to the invention.

In general, it may be said that the papers according to the invention may contain a very low proportion of colouring material. The paper according to the invention, differs from most of the known duplicating papers in that the substance transmitted in the writing process consists mainly of particles of synthetic resin powder which have a soft, ductile character, in other words, synthetic resin, and not mainly colour pigment particles.

The donor layer preferably comprises from about 75 to about 100% by weight of homopolymer particles. The colour pigment content, if present, is preferably not more than about 25% by weight.

Surprisingly, it has been found that with the copying papers of the invention it is possible, in the layer comprising colour pigments and powder particles of a synthetic resin, especially based on polyvinyl chloride, which particles are locally joined together at their points of contact, not to use the colour pigments but to realise the colouring of the PVC-powder particles by using a real soluble dye. The advantages of such new self-copying papers with coloured polymer particles are obvious. It becomes possible, for example, to manufacture C-papers which by application of local pressure, do not write at all on neutral or untreated paper. This is a big inconvenience inherent in the papers which are on the market at the moment. Further, the smudge and grease resistance is improved considerably. The mixing process for the manufacture of the dye is considerably reduced and simplified technically, due to the quick dissolving of the dye. Into the application container (dye container) of the coating machine, no pigment sedimentation or colour pigment agglomeration arises finally at all, so that it is possible to make a perfect coating without stripe formation.

At first sight, such a colouring process using soluble dye exclusively for the manufacture of coloured layers transferable by application of a pressure seems impossible. Soluble dyes, compared to colour pigments, have a lower covering property. Therefore, relatively large percentages of soluble dyes must apparently be dissolved to obtain a colour layer which can be seen sufficiently. On the other hand, the dye dissolved in the coating preparation goes through or colours through the basepaper when applied. This problem has been solved.

Surprisingly, it was found that, when applying soluble dyes, classified in four groups according to their chemical origin, (1) cationic dyes
(2) anionic dyes
(3) metal complex dyes
(4) nonionic dyes particularly cationic dyes as for example, basic dyes or in particular the free colour bases for example, of the di- or triarylmethane, phenazine, keonimine, azodyes, etc., types at extremely low colour material concentrations, extraordinarily intensive adherent and bright colouring of the polymer particles are obtained. The dye is fixed to the PVC- particles so firmly that, with volatile organic solvents, it is dissolved out in such small quantities that free dye can scarcely be present, if at all. Basic dyes contain in the dye molecule active, basic $NH_2$ groups in a free or substituted condition. The special structure of the solvated polymer molecule, as well as the existing acid chlorine atom in the molecule enable firm fixation of the basic groups of the dye. It was moreover found that with increasing solvation or degree of swelling (extension of the surface weakening through releasing of the molecular binding) an increase of the volume of binding, of soluble dye appears. Such a coating mixture, consisting of organic volatile swelling agents, polymer powder particles and dissolved dye bases, can have the big disadvantage to colour through when coating the base paper. This disadvantage can be avoided by centrifuging and making a new preparation of the centrifugal solution in fresh, organic solvents and immediately coating. Of course, the centrifugin process is costly and takes much time.

Surprisingly, it has been found that it is possible to flocculate the surplus of colour bases in the existing organic volatile swelling agents by adding complex — or heteropoly acids, especially molybdatophosphoric acids only (these being soluble in individual organic solvents) as organic dye elements. It is known how to really lacquer basic dyes soluble in water of the triarylmethane type under the action of dissolved metal compositions or heteropolyacids. A thin layer chromatogram showed, however, that the dye elements flocculated into organic volatile solvents only contain from 10 to 20 percent of the dye lacquer as it appears when precipitating in water. According to this partial flocculating process, it is possible to avoid the coating mixture going or colouring through as the flocculated dye particles are as known filtered by the paper fibres. It should be noted that according to this partial flocculating process, especially in organic solvents, one generally succeeds in obtaining insoluble elements in situ during the mixing process and, for example, to colour the PVC powder particles on their surface with extremely fine dye flocculation. Of course, this partial flocculating process is not limited to PVC powder particles.

Moreover, it has been found that dye bases dissolved in organic solvents not only colour the polymer powder particles intensively but also the paper. This is in connection with the acid content of a normal coating paper. It is known that, for example, dye bases such as triarylmethane under the influence of acids produce dye salts intensively coloured and soluble. Therefore, it seems less astonishing that other basic insoluble dyes; as for example nonionic or especially metal complex material in the same concentration, give a considerably less visible dyeing of the paper. Surprisingly, it was found that metal complex dyes dissolved or incompletely dissolved in organic volatile solvents dissolve when dye bases are added and that, under dye change or dye intensification, a new dye complex agglomeration is probably formed which, in the same way as a dye base, covers the polymer particle intensely and is fixed firmly.

It is possible in a simple and elegant way with relatively small or larger additions of metal complex dye or dyes, to dissolved dye base or bases, to neutralise the exceeding colouring dye base and not only therewith perfect different tints or shades in the coating, but also largely eliminate the ability for the dye complex agglomeration to go through the paper. The complete elimination of the going through ability is obtained by a specific regulation of the swelling degree and moreover by a high machine speed of not less than 100 m/minute.

Another feature of the present invention lies in the use of special vinyl chloride polymer material for the donor layer which may or may not contain colour pigment. Most PVC powders obtainable commercially are polymers prepared in a known manner by emulsion, suspension or mass polymerisation. The most important properties of these known pure vinyl chloride polymers are laid down in the Standards Specification Sheet DIN 7746 of the association of Standards for Synthetic Resins of the German Standards Association (Distributors: Beuth-Vertrieb GmbH of Berlin and Cologne).

The assortment of PVC powders obtained by the basic processes mentioned above and their almost countless number of types which can be classified according to certain physical and chemical data constitute a problem even to the expert when he is confronted with the task of making a choice from this wide variety. To this is added the fact that these three basic processes are capable of numerous variations leading to numerous special types of PVC which are in most cases suitable for quite specific purposes. One such special type, for example, is constituted by the special PVC pastes.

It has now surprisingly been found that PVC powders containing emulsifiers of the type obtained by the emulsion polymerisation process, suitably selected according to the range of particle sizes and the molecular weight or K-value are suitable for the production of the paper according to the invention especially, in the form of PVC pastes or of PVC powders suitable for this purpose. Although PVC powder containing emulsifier which has been selected in accordance with these factors is available commercially, it has hitherto only been used to a minor extent and has not been known for the purpose described here.

It has been found that one should use a PVC material which still contains, as residue from the emulsion polymerisation process, from 0.01 to 4.0% by weight of the emulsifier used in the process. The amount of emulsifier should preferably be from 0.1 to 2.0% by weight. The emulsifier present, surprisingly, has the effect of producing characters with very sharp contours, especially when using pigments/dyes which are liable to bleed (soluble or partly soluble), these dyes dissolving in the minute amounts of the emulsifier present.

In addition, it has surprisingly been found that the K-value of the PVC powder used is also important. The PVC containing emulsifier used for producing the paper should have a K-value in the range of from 60 to 80 and preferably about 70. Determination of the K-value was carried out in accordance with the specifications of DIN 53 726 of the association for Standards of Synthetic Resins in the German Standards Association (Distributors: Benth-Vertrieb GmbH of Berlin and Cologne).

Another criterion which must be taken into account in the choice of PVC powder is the particle size of the synthetic resin particles and the sieve residue according to DIN Standard 53 195.

The particle size of the particles should be below about 50μ and preferably about 10μ if the desired results are to be achieved. The sieve residue according to the general DIN specification should be such that it can be classified as 3 or less, that is the sieve residue should be not more than about 34% by weight under the conditions indicated.

The pastes of swollen PVC powder or application mixtures used preferably have a PVC solids content of up to about 30% by weight, especially 5 to 20% by weight, and optionally contain up to about 25% of colour pigment, based on the PVC content.

The layer produced in this way consists of particles of synthetic resin powder which have been joined together at their surfaces of contact by swelling, this union of particles having been achieved without the aid of an additive or adhesive. The layer therefore has a pseudo film structure and has an infinite number of potential points of breakage. In contrast to similar layers in some of the known duplicating papers, it is not brittle but elastic.

The liquid or volatile organic swelling and distributing medium used may be either a chemically uniform substance or mixtures of such substances which have a suitably low dissolving power for the polymer used for the donor layer, or a mixture of a solvent and a diluent which suitably reduces the dissolving power of the solvent. It is essential that formation of the layer should not be based on the known principle of flocculation precipitation of a dissolved substance by a non-solvent but that genuine swelling of the PVC material followed by drying of the synthetic resin powder particles which have only undergone swelling should take place.

It should be noted particularly that, when producing a paper according to the invention, the PVC particles used are subjected to swelling and not to gelatinisation. In this swelling process, it is an important principle that only chemical substances or combinations of swelling agents of the type in which the synthetic resin material is relatively insoluble may be used so that they cannot be regarded as solvents in the real meaning of the word. In contrast to gelatinisation, the effect of the medium does not go beyond the formation of envelopes of solvate round the molecules situated at the surface or in the interspaces of the polymer. Irreversible separation of the individual molecules therefore does not take place. On removal of the swelling medium, the swelled material is restored to the state in which it existed before swelling.

The following are examples of suitable swelling agents which may be used for producing the duplicating paper according to the invention:

Cyclohexane/trichloroethylene/xylene (low swelling action);

Ethyl acetate/acetone (medium swelling action);

Ethylene chloride/methyl ethyl ketone (high swelling action);

Tetrahydrofuran (solvent). The degree of swelling is observed to increase in the given sequence.

On the basis of this swelling sequence, the PVC particles can readily be adjusted to a specific degree of swelling by suitable choice of certain organic solvents, and hence the union of PVC powder particles and efficiency of copying on the one hand and the resistance to smudging of the copying paper which is free from carbon on the other hand can be regulated. Any number of other organic solvents can be placed in the swelling sequence shown above so that the extent of swelling can be finely graded and consequently it is possible, if desired, to use only one solvent as swelling agent, this solvent frequently being one which has a low or medium swelling action.

This very fine adjustment of the degree of swelling is generally achieved by using a combination of solvents which has a low, medium and high swelling action or by mixing these solvents with genuine PVC solvents.

The basic solvent used is frequently one which has a low swelling action. After introduction of the PVC powder, the powder swells to form a paste. A small proportion of a substance which has a medium or high swelling action is then added. After the paste has been spread on paper in a laboratory test, the resistance to smudging and the union of particles can be assessed qualitatively, for example by a finger test. If it is desired to obtain a very high resistance to smudging, the union of PVC particles must be produced with a higher proportion of substances which have a high swelling action or by adding a substance which has an exceptionally high swelling action, for example methyl ethyl ketone. Lastly, the proportion of substance which has a low swelling action can be varied in the direction of a higher degree of swelling and quantitative proportion. Such solvent combinations of an organic solvent which has a low swelling action with a small quantity of an organic solvent which has a higher swelling action, therefore, provides a convenient method of adapting the degree of swelling of the whole system to the particular requirements. Furthermore, the system can be adjusted to a wide variety of highly differentiated degrees of swelling by mixing a low swelling, medium swelling or high swelling agent or a selected mixture of such agents with a true solvent such as tetrahydrofuran in proportions of for example up to 25%.

The degree of union between the particles can, therefore, be adjusted as desired by regulating the degree of swelling of the synthetic resin powder particles. Swelling of the synthetic resin powder particles results in a substantial increase in their size and formation of a soft, plastic paste. The swelled synthetic resin particles are very slippery and they readily give up their solvent.

Not only the consistency of the paste of swelled particles but also its solid content can be adjusted as required by suitable choice of the volatile organic medium or by varying the combination of solvents. It is thereby possible to produce pastes of swelled particles comprising a materially uniform substance of pure vinyl chloride polymer particles, that is they are free from the usual additives such as waxes, oils, binders, fillers, thickeners, etc. and yet have a suitable consistency for coating.

Application of the paste may be carried out in a suitable manner, for example with a coating knife or a roll coater or by the aniline printing process, and conveyor rates of about 300 m/minute with applications of, for example, about 0.5 to 1.0 $g/m^2$ of dry substance can be achieved. When applying the paste, the soft or deformable swelled PVC particles are apparently or rolled out so that the particles of colour pigment if present are substantially included. The degree of union between the PVC particles can be reduced by this deformation method, whereby even lighter transmission with sharper contours can be achieved and at the same time the paper produced has a higher resistance to smudging. Furthermore, if desired, the content of colour pigment can be increased for a given degree of swelling because the deformation method results in high smudge resistance.

According to the invention, it is therefore possible to use donor layers containing only 0.5 g of dry substance per $m^2$ or even less, which was hitherto insufficient for producing a satisfactory colour tone. The coated web of paper may be dried by subjecting it to a blast of air at normal temperature (cold process), using a drying channel of 3 to 4 m in length.

A single layer which not only has a very smudge resistant free surface but which is distinguished by its very high mechanical resistance due to its special structure formation can easily be produced according to the invention by the method described above. The anti-adhesive character of the PVC particles and the absence of any additive or similar substance and the increase in the size of the synthetic resin powder particles due to the swelling process, which enables an extremely thin layer to be produced which is almost flexible due to the union of particles, ensure that the layer of synthetic resin formed will not be permanently fixed to the support.

A layer formed according to the invention can react to the slightest writing pressure or rolling pressure so that the substance of the layer is completely lifted off and the particles are forced out of the ductile layer structure predominantly at the preformed potential points of breakage.

Although the uniform layer of pure vinyl polymer powder produced according to the invention is suitable for use with a large number of different plastic materials varying in their chemical structure as transfer media, it has been found that it is especially advantageous to use, as a receptor layer, a layer consisting of homopolymers or copolymers of a soft polyethylene which is preferably branched and has a low degree of crystallinity. The polymer of the transfer layer may also be applied in the form of swelled particles. These swelled particles may be obtained by heating polyethylene homopolymers or copolymers in volatile organic solvents until true solution takes place and cooling the solution to room temperature.

The synthetic resin material used for producing the transfer or receptive layer preferably consists of low molecular weight polyethylene homopolymers or copolymers having a molecular weight of up to about 10,000, preferably up to about 5,000, and a density of from 0.9 to 0.93, preferably from 0.91 to 0.925. Especially advantageous results are obtained by using a synthetic resin material which has a certain degree of hardness (penetration) to produce a transfer or receptive layer having a penetration according to DIN 51 579 of 1 to 34 and preferably 1 to 25.

When using polyethylene copolymers, which can be introduced as separate component(s) and also as mixing components, one should use mainly those which contain the copolymer component in a proportion of up to about 40% by weight and preferably up to about 10% by weight and as a mixing component preferably contains from 25 to 35% by weight.

In another method of carrying out the invention, the material used for the receptor layer comprises oxidized soft polyethylenes which contain carboxyl groups and which can be prepared by oxidizing branched polyethylenes of low crystallinity or by copolymerising ethylene with unsaturated monocarboxylic or dicarboxylic acids. The acid member of these polyalkylenes which contain carboxyl groups is generally from 5 to 100 and preferably from 10 to 70.

To apply the transfer or receptive layer, these synthetic resin materials are dissolved in organic solvents and applied in a known manner in amounts of about 1 to 1.5 g of dry substance per $m^2$ in the case of C-paper and about 0.5 to 1.0 g of dry substance per $m^2$ in the case of S-paper while the web of paper which is being coated is conveyed at the rate of about 300 m/min, for example.

The soft, plastic, pasty consistency of the receptor coating can readily be adjusted to the most suitable coating viscosity and solids content by dilution with organic solvents as necessary.

It has been found that the receptor layer based, on the chosen soft polyethylenes according to the invention, is perfectly free from gloss and moreover, due to the increase in its specific surface area and to some extent due to its microporous structure, it can generally be printed on perfectly satisfactorily without the use of the special printing paste inks which were hitherto required. These two criteria constitute an important technical advance, especially in the case of C-papers.

The swelled particles of polyethylene used according to the invention not only have a high gliding capacity and only a slight tendency to penetrate the donor layer or substrate but they unite in a special way with the particles of selected types of PVC when brought into contact with them under pressure.

According to one method of carrying out the invention, which has been developed for producing S-papers, the foundation layer comprises uniform mutually adherent particles of pure vinyl chloride polymer powder without the addition of any colour pigment. On this layer there is a layer, of polyethylene which contains small amounts of colour pigment or dye of up to about 25% and preferably up to about 20%, based on the proportion of polyethylene. It must be regarded as surprising that such duplicating papers generally neither smudge nor show any weakness in the colour of the characters formed.

On application of the transmitting layer, the organic solvents present cause the layer of PVC resin to swell, causing the formation of a slippery surface so that the layers unite superficially in response to the least possible application of layer substance. The small amount of total substance applied in the layers (PVC layer and polyethylene layer), for example amounting to about 2 $g/m^2$, is compressed by the pressure of type so that the PVC layer and covering layer penetrate in such a way that the colour pigment is uniformly distributed and becomes visible. This particular embodiment of the invention provides excellent self-copying papers which are eminently suitable both for data processing machines and for addressing machines.

Figure 2:
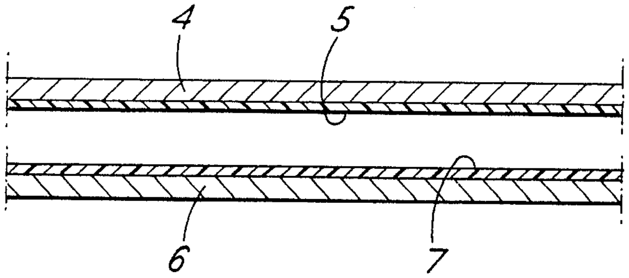

For a better understanding of the present invention, reference will now be made by way of example to the attached drawings in which FIG. 1 shows a cross-sectional view through a paper according to the invention which is adapted to be used as S-paper, and FIG. 2 shows a cross-sectional view through a paper according to the invention which is adapted to be used as C-paper.

The S-paper according to the invention, comprises a layer 2 on a paper support 1. The layer 2 is substantially uniform in material and comprises a pure vinyl chloride polymer which has been prepared by emulsion polymerisation and which has the characteristic properties already defined above. On this foundation layer there is a covering or transfer layer 3 which is composed substantially as optionally modified homopolymers or copolymers of ethylene.

The C-paper according to the invention comprises a layer 5 similar to the layer 2 of the S-paper applied to a paper support 4. These C-papers also comprise, as one of their constituents, a receptive material which consists substantially of a suitable support 6 and of a receptor layer 7 applied to the upper surface thereof. The composition of this receptor layer in C-paper may be similar to that of the covering layer 3 in S-paper.

ZAPON FAST BLACK RE is an azo dye. The coupling component is -naphthol, with 2-hydroxy-4-nitro-aniline. Two molecules of the azo couple with one atom of chromium.

ZAPON FAST RED BD is an azo dye. The coupling component is

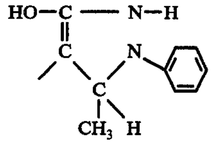

with 2-hydroxy-e-nitro-aniline. Two molecules of the azo couple with one atom of chromium. (Possible alternative to ZAPON FAST BLACK RE.)

ZAPON FAST RED 3B is a mixture. The first component is azo dye. The coupling component is -naphthol substituted in the 6 and 8 position with $SO_3Na$, with 2-hydroxy-5-chloro-aniline. Two molecules of the azo couple with one atom of chromium. The second component is Rhodamine B (possible alternative to ZAPON FAST BLACK RE).

VICTORIA BLUE BASE B is a diphenylamine derivative. The diphenylamine is connected to a carbon atom, to which is connected through a double bond, a naphthyl ring in the quinoloid form, with a

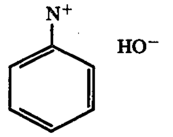

group attached thereto.

The Neozapon equivalents to the Zapon dyes could be used. These are, we understand, of the same general formula as the corresponding Zapon dyes, but are sulphonated or sulphonated and then aminated.

As a further example, suitable Orasol dyes (made by CIBA) could be used.

The following Examples illustrate the present invention.

EXAMPLE 1

100 l of ethyl acetate (medium swelling action) were introduced into a high speed stirrer system rotating at the rate of between 500 to 2000 revs/min, and 22.0 kg of finely dispersed PVC pastes containing emulsifier were added. The mixture was stirred for about 30 minutes with cooling until a homogeneous paste of swelled particles was obtained. 2.0 kg of carbon black pigment was then added. Stirring was then continued for about 30 minutes accompanied by cooling with water.

Coating of the substance on a paper support was then carried out in the usual manner. The basic coating mixture prepared in this way is suitable for the production both of C-paper and S-paper.

900 l of trichloroethylene and 10.0 kg of soft polyethylene (penetration DIN 51 579 1-34) were introduced into a double walled metal container adapted to be closed with a cover and equipped with a slow stirrer mechanism and a reflux cooler. This mixture was heated to about 60° to 70° C and stirred until all the soft polyethylene had gone into solution, which took between 45 and 60 minutes. The solution was then cooled to room termperature while stirring was continued, a pasty mixture suitable for application being formed. This mixture can be applied without any further after-treatment to a covering layer for the production of S-paper or to a receptive layer for the production of C-paper. If the mixture is to be diluted to a certain consistency for brush application or if a colouring agent is to be added, this is advantageously carried out after the mixture has been cooled to room temperature with constant stirring for from ¼ to ½ hour.

EXAMPLE 2

The first process described in Example 1 was repeated but, instead of the swelling agent used therein, a mixture of 60.0 l of xylene (low swelling action) and 40.0 l of ethylene chloride (high swelling action) was used. This swelling system may either be used as a mixture or the high swelling agent may be added separately to the system. The quantity of PVC powder used in this case was 25.0 kg, and 6.0 kg of anthraquinone pigment was used as colouring agent. The colour mixture produced in this way is suitable for the production of both C-paper and S-paper.

EXAMPLE 3

The first process described in Example 1 was repeated but, instead of the medium swelling agent, a mixture of 70.0 l of cyclohexane (low swelling agent) and 30 l of tetrahydrofuran (solvent) was used. The quantity of PVC powder used in this case is 20.0 kg and 1.8 kg of an azo dye was used as colouring agent. The colour mixture produced in this way is suitable for the production of both C-paper and S-paper.

EXAMPLE 4

The first process described in Example 1 was repeated but, instead of the medium swelling agent, a mixture of 82.0 l of xylene (low swelling agent), 16.0 l of ethylene chloride (high swelling agent) and 2.0 l of tetrahydrofuran (solvent) was used. The quantity of PVC powder used in this case was 22.0 kg. 1.8 kg of an azo dye was used as colouring agent.

The colouring agents used for producing the duplicating papers according to the invention are advantageously of the type which, owing to the fineness of their particles or their pasty consistency, do not require to be triturated but can be distributed sufficiently finely simply by dispersion in high speed stirrer systems. Preferably however, the colour is provided by dyeing of the vinyl chloride homopolymer.

Instead of the process described above, the basic coating mixture may also be prepared by introducing the PVC powder and colouring agent together into the swelling agent or mixture of swelling agents contained in the reaction vessel and then starting the stirring process.

EXAMPLE 5

The procedure described in the second part of Example 1 was repeated but 1.0 kg of carbon black pigment was added as colouring agent to the given quantities of trichloroethylene and soft polyethylene.

Instead of trichloroethylene which has been mentioned here by way of example, one may, of course, also use other suitable solvents for the covering or receptive layer.

EXAMPLE 6

Use of a single organic swelling agent having a specific degree of swelling in association with one or more soluble cationic dyes.

100 liters of ethyl acetate (medium swelling agent) were introduced into a fast agitator running at from 500 to 2000 rpm and 22.0 kg of finely particulate emulsifier-containing PVC paste were added. Agitation was continued with simultaneous cooling for about 30 minutes until a uniform swollen paste had evolved, whereafter from 0.1 to 0.7 kg triarylmethane type dye was added.

Agitation was continued with water cooling for about 10 minutes, whereafter the resulting mixture was centrifuged, whereafter the centrifugate was introduced into the same container and cleaned, rapidly agitated together with a further 100 liters of ethyl acetate and agitated with simultaneous cooling for a maximum of 30 minutes.

The subsequent step of coating a paper support was conventional. The resulting mixture was of use for the production of C-paper and S-paper.

Mention can also be made of the use in this connection of adsorbants, more particularly on a base of organic montmorillonite derivatives prepared by a ion exchange reaction between sodium ions of montmorillonite types and alkylammonium bases, e.g. dimethyldioctadecyl - ammonium - montmorillonite. This step, possibly with an addition of 1–2% based on the finished mixture, obviates the need for the centrifuging step.

EXAMPLE 7

Use of a mixture of organic swelling agents having different degrees of swelling in association with one or more cationic dyestuffs.

The process of Example 6 was repeated except that the medium swelling agent was replaced by a mixture of 60 liters of xylene (low swelling agent) with 40 liters of ethylene chloride (high swelling agent).

EXAMPLE 8

Modulation of excess of e.g. dye base by Heteropoly acids or complex acids.

The process of Example 1 was repeated; however, after addition of the dye base and subsequent agitation of about 10 minutes, the mixture, instead of being centrifuged, was mixed with about 500–700 g of molybdatophosphoric acid $H_3 [P (MO_3 O_{10})_4]$ and agitated with cooling for about another 15 to 30 minutes. The addition of the molybdatophosphoric acid can be effected as a crystalline powder or from a solution, for example 0.7 kg of molybdatophosphoric acid in 5.00 liters ethyl acetate. If required, the dye base can be completely flocculated before the addition of the PVC powder ingredient, in which event a larger proportion of molybdatophosphoric acid would be used, for example 1.00 kg of molybdatophosphoric acid in 5.00 liters of ethyl acetate.

The subsequent step of coating a paper support was conventional. The resulting mixture was of use in the preparation of C-paper and S-paper.

The invention is not limited to the Example just mentioned; for instance, the molybdatophosphoric acid addition could be made in a sequence other than the one just mentioned.

EXAMPLE 9

Use of a mixture of organic swelling agents having different degrees of swelling in association with one or more soluble cationic dyestuffs having one or more soluble metal complex dyestuffs 20 liters of ethyl acetate were introduced into a fast agitator running at from about 500 to 2000 rpm and 400 g of metal complex dyestuffs and 300 g of dye base, for example of the triarylmethane type, were added and dissolved with agitation for up to about 15 to 30 minutes. A further 80 liters of toluene were then added. After a short but thorough mixing, 30 kg of finely particulate emulsifier-containing PVC powder were added. Agitation with simultaneous cooling was effected for about 30 minutes until a homogeneous swollen paste had evolved. The subsequent step of coating a paper support was conventional.

The resulting mixture was of use in the preparation of C-paper and S-paper.

EXAMPLE 10

The composition constituting the donor layer was made up as follows:

To 20 liters of ethyl acetate there was added 400 grams of Zapon Fast Black RE. This mixture was then stirred for 5 minutes. Thereafter, 300 grams of Victoria Blue Base B was added and the whole stirred for 10 minutes. 80 liters of trichloroethylene was added, followed by stirring for 5 minutes and 30 kilograms of PVC added. The vinyl chloride homopolymer was a finely particulate grade, such as Huls B7021 grade, Vinol P70ps of Vacker or I.C.I.'s "pasting" quality PVC. All were soft, swellable grades. The whole mixture was then stirred for 20 minutes (good agitation). Alternatively, 40 minutes (poor agitation) could be used. The temperature should at no time exceed 20° C,.

The composition for the acceptor coating was made up as follows:

21 liters of toluene with 30 liters of petroleum ether (80/110 fraction) were heated to 75° C with 12 kilograms of polyethylene granules until the solution is clear. A further 37 liters of the petroleum ether was then added and the whole mixture rapidly cooled to room temperature (if the mixture had been thixotropic it would have been further diluted with additional petroleum ether).

The layers were applied by a conventional doctor blade technique.

EXAMPLE 11

| | |
|---|---|
| PVC paste | 20–30 kg |
| Ethyl acetate | 20 liters |
| Toluene | 80 liters |
| Victoria Blue Base B | 500 g |
| Fast zapon Black RE | 300 g |

-continued

| | |
|---|---|
| Benzoic acid | 100 g |

EXAMPLE 12

| | |
|---|---|
| PVC paste | 20–30 kg |
| Ethyl acetate | 30 liters |
| Trichloroethylene | 70 liters |
| Fast Zapon Black RE | 300 g |
| Orasol Violet | 500 g |
| Organic acid | 200 g |

EXAMPLE 13

| | |
|---|---|
| PVC powder | 20–30 kg |
| Ethyl acetate | 20 liters |
| Methylene chloride | 15 liters |
| Trichlorethylene | 65 liters |
| Irgacet Brown | 600 g |
| Neozaponbordo B | 350 g |
| Organic dyestuff acid | 150 g |

SPECIAL APPLICATIONS OF PAPER ACCORDING TO THE INVENTION

Use of thin paper support material of approximately 18–21 $g/m^2$ surface weight associated with conventional carbon paper or one-only carbon paper manufacture for the production of C and S paper in the production of an absolutely smudge-proof once-only paper (paper support over a dye coating over a receptor/transfer layer)

Use of thin-paper coatings as above in place of smudging once-only carbon paper, for example separating sets with neutral white top sheet and smudge-proof once-only paper insert (see drawing) (separating set, top sheet, once-only S paper, C-papers)

Use of thin-paper coating on smudge-proof once-only paper, for example computer sets instead of smudging once-only carbon paper which yields only two to three useful copies.

By contrast, a computer set according to the invention can yield at least seven good copies and one wipe-proof once-only paper insert (computer paper, once only copy paper, computer paper etc.)

Use as separating sets (computer set comprising computer paper with inserted once-only coating).

The following defines preferred features of the invention. We claim:

1. A sheet of paper consisting of a support layer and a substantially uniform donor layer of particulate mutually adherent particles of a vinyl chloride polymer, the polymer having been produced by emulsion polymerization, containing the range from 60 to 80, the particles having an average size of 50 $\mu$ or less and having sieve residues under standard DIN conditions of not more than 34% by weight, and said polymer having been dyed by a dye selected from the group consisting of anionic dyes, non-ionic dyes and mixtures thereof prior to incorporation onto said sheet of paper.

2. A sheet of paper according to claim 1, wherein the polymer is dyed with a non-ionic dye.

3. A sheet of paper according to claim 1 wherein two or more dyes of the same or different type are used.

4. A sheet of paper according to claim 1 wherein the polymer is anionically dyed.

* * * * *

UNITED STATES PATENT OFFICE
CERTIFICATE OF CORRECTION

Patent No. 4,098,947 Dated July 4, 1978

Inventor(s) Joachim Schmidt, et al

It is certified that error appears in the above-identified patent and that said Letters Patent are hereby corrected as shown below:

Column 2, line 38: "dying" should be --dyeing--.

line 45: After "preferably" insert a comma.

Column 3, line 6: After "homopolymer" insert a comma.

Column 4, line 19: Before "an" insert a comma.

line 25: "centrifugal" should be --centrifuged--.

line 27: "centrifugin" should be --centrifuging--.

Column 9, line 32: Insert a comma after "layer" (1st occurrence); cancel the comma after "layer" (2nd occurrence).

UNITED STATES PATENT OFFICE
CERTIFICATE OF CORRECTION

Patent No. 4,098,947 Dated July 4, 1978

Inventor(s) Joachim Schmidt, et al

It is certified that error appears in the above-identified patent and that said Letters Patent are hereby corrected as shown below:

Column 12, line 35: "a" should be --an--.

Column 14, line 53: After "containing" insert --from 0.1 to 4% by weight of an emulsifier and having a k-value in--.

Signed and Sealed this

*Sixth* Day of *March 1979*

[SEAL]

*Attest:*

RUTH C. MASON
*Attesting Officer*

DONALD W. BANNER
*Commissioner of Patents and Trademarks*